(12) United States Patent
Nakada et al.

(10) Patent No.: US 6,889,545 B2
(45) Date of Patent: May 10, 2005

(54) FLOW RATE SENSOR

(75) Inventors: Keiichi Nakada, Hitachinaka (JP); Junichi Horie, Hitachinaka (JP); Izumi Watanabe, Hitachinaka (JP)

(73) Assignees: Hitachi, Ltd., Tokyo (JP); Hitachi Car Engineering Co., Ltd., Ibaraki (JP)

( * ) Notice: Subject to any disclaimer, the term of this patent is extended or adjusted under 35 U.S.C. 154(b) by 0 days.

(21) Appl. No.: 10/778,205

(22) Filed: Feb. 17, 2004

(65) Prior Publication Data

US 2004/0163464 A1 Aug. 26, 2004

(30) Foreign Application Priority Data

Feb. 26, 2003 (JP) ........................................ 2003-049181

(51) Int. Cl.[7] ................................................ G01F 1/68
(52) U.S. Cl. ................................................ 73/204.26
(58) Field of Search ........................ 73/204.11, 204.15, 73/204.26

(56) References Cited

U.S. PATENT DOCUMENTS 4,581,728 A * 4/1986 Nakamura et al. ....... 369/44.37
4,651,564 A * 3/1987 Johnson et al. .......... 73/204.26
4,888,988 A * 12/1989 Lee et al. ................. 73/204.26
5,765,432 A 6/1998 Lock et al.

* cited by examiner

Primary Examiner—Harshad Patel
(74) Attorney, Agent, or Firm—Mattingly, Stanger, Malur & Brundidge, P.C.

(57) ABSTRACT

A flow rate sensor detects the flow rate in a pulsating condition including a large amount of the reverse flow. Upstream temperature sensors and downstream temperature sensors are formed in both sides of a heater, parallel resistors are formed in the external side of a thin film portion (cavity), and the downstream temperature sensors are connected at the contacts. The upstream and downstream temperature sensors are respectively allocated to the four sides of the bridge circuit so that the sensors of the same type are not side by side and the electrodes are balanced when the flow rate is zero. The upstream temperature sensor is cooled during the forward flow, while the downstream temperature sensor is influenced by the heater but virtual change is rather small and potential difference between the electrodes becomes larger. During the reverse flow, the downstream temperature sensor is cooled but virtual change is rather small.

11 Claims, 11 Drawing Sheets

A—A

B-B (a)

(b)

FLOW RATE SENSOR

FIELD OF THE INVENTION

The present invention relates to a flow rate sensor for measuring flow rate using a heater and more specifically to a flow rate sensor suitable for measuring a flow rate of the intake air, for example, of an internal combustion engine.

BACKGROUND OF THE INVENTION

As the flow rate sensor installed in an intake air passage of an internal combustion engine of an automobile for measuring flow rate of the intake air, a thermal type sensor is mainly used because it can detect in direct mass flow rate. A thermal measuring device is manufactured with a semiconductor ultra-fine processing technology on a semiconductor substrate like a silicon (Si) substrate. This technology is very economical because it can easily realize mass-production system. Moreover, attention is paid to this manufacturing technology because the manufacturing facility is rather small in size and can be driven with lower electric power.

As the flow rate measuring device, a flow rate sensor described in the patent document 1 is known. This sensor measures flow rate with a temperature sensor allocated in a thin film area formed on a substrate. Since this thin film area has small thermal capacity, thermal response can be obtained quickly in accordance with change of flow rate.

When a flow rate sensor using a flow rate measuring element which responds quickly is applied to the control of automobile, even if flow rate changes rapidly or pulsation is generated within the intake pipe, it is possible send response corresponding to change of flow rate. Therefore, even in the operating condition described above, more accurate flow rate of air can be measured than that of the flow rate sensor of slower response rate having larger thermal capacity.

The flow rate sensor described in the patent document 1 allocates temperature sensors in the upstream and downstream sides of a heater for the flowing direction and it is heated with a heater. When the air does not flow, the temperature sensors allocated in the upstream and downstream sides are set to almost equal temperature and temperature difference between these sensors is almost zero. When the air starts to flow, a temperature sensor allocated in the upstream side of heater is cooled, while a temperature sensor allocated in the downstream side is further heated by receiving the heat from the upstream side. Temperature difference is therefore generated between the temperature sensors provided in the upstream and downstream sides. Since this temperature difference varies depending on the flow rate of air, the flow rate of air can be detected from the amount of temperature difference. Moreover, since a resistance value of the temperature sensor changes depending on the temperature, a voltage signal can be obtained depending on the flow rate by utilizing change of resistance value.

Moreover, when the air flows in the reverse direction, the temperature sensor of this type allocated in the downstream side of the heater is cooled on the contrary to the case described above. Accordingly, the flow rate in the reverse direction can also be detected, realizing detection of the air in the flowing direction. Measurement of the flow rate of air can therefore be realized more accurately than that with the flow rate sensor not including a direction detecting means even under the operating condition that the air flows toward an air cleaner from an engine (reverse flow of fluid).

[Patent Document 1]
Japanese Unexamined Patent Publication No. 500490/1998 (FIG. 1, line 3 to 18 on page 5 of the Specification)

Intake air pulsation usually increases in the lower number of revolutions of a 4-cylinder engine and reverse flow has been often generated at a throttle angle near the full throttle angle. In the case of an engine which can realize complicated controls such as variation of opening or closing time of valve corresponding to the restriction on exhaust gas and realization of low fuel consumption or the like in the recent years, pulsation and reverse flow are generated under the higher number of revolutions and thereby amount of reverse flow tends to increase.

Meanwhile, a voltage output type flow rate sensor for automobile assigns a voltage range of 0 to 5 V used in a control unit to the predetermined range of the flow rate of the engine. In the case where reverse flow is also detected, the range of flow rates in both forward and reverse flowing directions must be assigned within this voltage range. Since the conventional flow rate detecting element detects flow rate with the identical principle for both forward and reverse flows, the forward flow characteristic becomes almost symmetrical to the reverse flow characteristic about the point where the flow rate is zero. For example, when the voltage region of 4 V in the forward flow range of 0 to 500 kg/h is necessary, the voltage range of 4 V in the reverse flow range of 0 to 500 kg/h is also required.

In the conventional automobile engine, since the reverse flow rate has been as small as about 50 kg/h or less, it has been possible to cover the required range of flow rate by setting, for example, the reverse flow region to 0 to 1 V and the forward flow range to 1 to 5 V.

However, since the reverse flow rate tends to increase recently, it is required to widen the voltage range to be assigned to the reverse flow region and therefore the range of flow rate assigned to the forward flow relatively becomes smaller. In this case, if the voltage signal can be read only in the step of 5 mV because of the performance of a microcomputer used in the control unit, amount of change of voltage becomes 5 mV or less even when the flow rate changes in the range of 1 to 3% in the low flow rate area. Accordingly, the control unit can recognize the flow-rate signal only with the accuracy of about 3% in the low flow-rate area.

Moreover, under the condition that pulsation becomes large in the engine and reverse flow is generated, waveform during generation of the reverse flow is no longer uniformed depending on the shape of the intake pipe. Uniformity of the reverse flow waveform is broken because of the reasons that (1) flow around the flow rate sensor when the pulsation is generated is disturbed when a flow rate sensor is inserted to the intake pipe, and (2) generation of reverse flow is not constant for each cylinder, etc. Accordingly, a flow rate error is generated between an average flow rate obtained within shorter time of every period of the pulsation waveform and an average flow rate obtained from longer time of several periods.

In the control unit, fuel injection amount of injector is determined based on outputs of the flow-rate sensors provided in the interval, for example, of 2 ms. As described above, when the flow-rate sensor output varies, control error due to such variation increases as the number of revolutions rises.

SUMMARY OF THE INVENTION

An object of the present invention is to provide a flow, rate sensor which can overcome the problems of the prior art and moreover can realize expansion of the region to detect reverse flow in the narrower voltage range, while suppressing drop of sensitivity in the forward flow.

In order to achieve the object described above, the flow rate sensor of the present invention comprises a heater, an upstream temperature sensor allocated in a forward flow side of the heater, and a downstream temperature sensor allocated in a backward flow side of the heater. A voltage is applied to both upstream temperature sensor and downstream temperature sensor to detect flow rate utilizing a voltage difference generated between the upstream temperature sensor and downstream temperature sensor. Moreover, this flow rate sensor is characterized in that the upstream temperature sensor and the downstream temperature sensor are provided with different thermal characteristics. Specifically, the thermal characteristics of the forward flowing condition where the fluid flows toward the downstream temperature sensor from the upstream temperature sensor are asymmetrical to those of the reverse flowing condition where the fluid of the identical flow rate to the forward flow flows toward the upstream temperature sensor from the downstream temperature sensor.

The flow rate sensor of the present invention is also characterized in providing configuration to provide the relationship of VF>VR between a voltage VF generated between the upstream temperature sensor and the downstream temperature sensor during the forward flow toward the downstream temperature sensor from the upstream temperature sensor and a voltage VR generated between the upstream temperature sensor and the downstream temperature sensor during the reverse flow of the flow rate which is identical to that of the forward flow toward the upstream temperature sensor from the downstream temperature sensor.

The flow rate sensor of the present invention is also characterized in that the heater, upstream temperature sensor and downstream temperature sensor are provided in a thin film portion, and that a resistive element is connected in parallel to the downstream temperature sensor at a position thermally more isolated from the heater than the downstream temperature sensor.

Namely, the upstream temperature sensor and the downstream temperature sensor are arranged to have asymmetrical sensitivity. When the sensitivity is asymmetrical, the sensitivity of forward flow, which is generally used, can be made larger than that of the reverse flow.

As an example of asymmetry, a downstream resistive element is connected in parallel to the temperature sensor provided in the downstream side of the heater as illustrated in FIG. 1. Here, the downstream resistive element connected is formed at the area no more thermally influenced by the heater than the downstream temperature sensor, for example, at the external side of the thin film portion. If reverse flow is generated, a resistance value does not vary because the downs-stream resistive element is neither thermally influenced by the fluid nor the heater. Accordingly, change of combined resistance value of the downstream resistive element and downstream temperature sensor becomes smaller than change of resistance value of only the downstream temperature sensor. As a result, voltage range of the reverse flow region becomes small. The voltage range of reverse flow rate can be set as desired by designing a value of the downstream resistive element conforming to the desired range of reverse flow rate.

Moreover, since change of the combined resistance described above dulls, for variation of reverse flow when the reverse flow is generated, an output in the reverse flowing condition due to the downstream resistive element, amount of variation is suppressed in comparison with that in the case where the downstream resistive element is not provided and thereby voltage change for variation of flow rate can be reduced.

In addition, it is also possible to provide the effect that self-diagnosis of fault generated if the thin film portion is broken can be realized with single body of the flow rate sensor by forming the downstream resistive element connected in parallel in the external side of the thin film portion and also by connecting the downstream temperature sensor in the external area of the thin film portion as illustrated in FIG. 1.

Moreover, in the present invention, the temperature coefficient of resistance TCRu of the upstream temperature sensor is set larger than the temperature coefficient of resistance TCRd of the downstream temperature sensor.

For example, the upstream temperature sensors Ru1, Ru2 and the downstream temperature sensors Rd1, Rd2 form a bridge as illustrated in FIG. 7. Even when temperature difference generated in the upstream temperature sensor and downstream temperature sensor is identical in the forward and reverse flowing conditions, a potential generated in the forward flowing condition becomes larger and thereby the asymmetrical characteristic can be attained.

Here, it is also possible to attain the asymmetrical characteristics in the forward and reverse flowing conditions by making asymmetrical the shape of the sub-passage up to the flow rate measuring element from the inlet port and the shape thereof up the measuring element from the outlet port. However, the sub-passage must be formed in the shape considering pulsation characteristic, flow rate noise characteristic, back-fire characteristic and dust characteristic, etc. and it is difficult to make asymmetrical as desired the characteristics of forward flow and reverse flow considering above listed characteristics. Accordingly, the flow rate sensor of the present invention for changing sensitivity of the forward flow and reverse flow is effective.

DETAILED DESCRIPTION OF THE EMBODIMENTS

Figure 1:
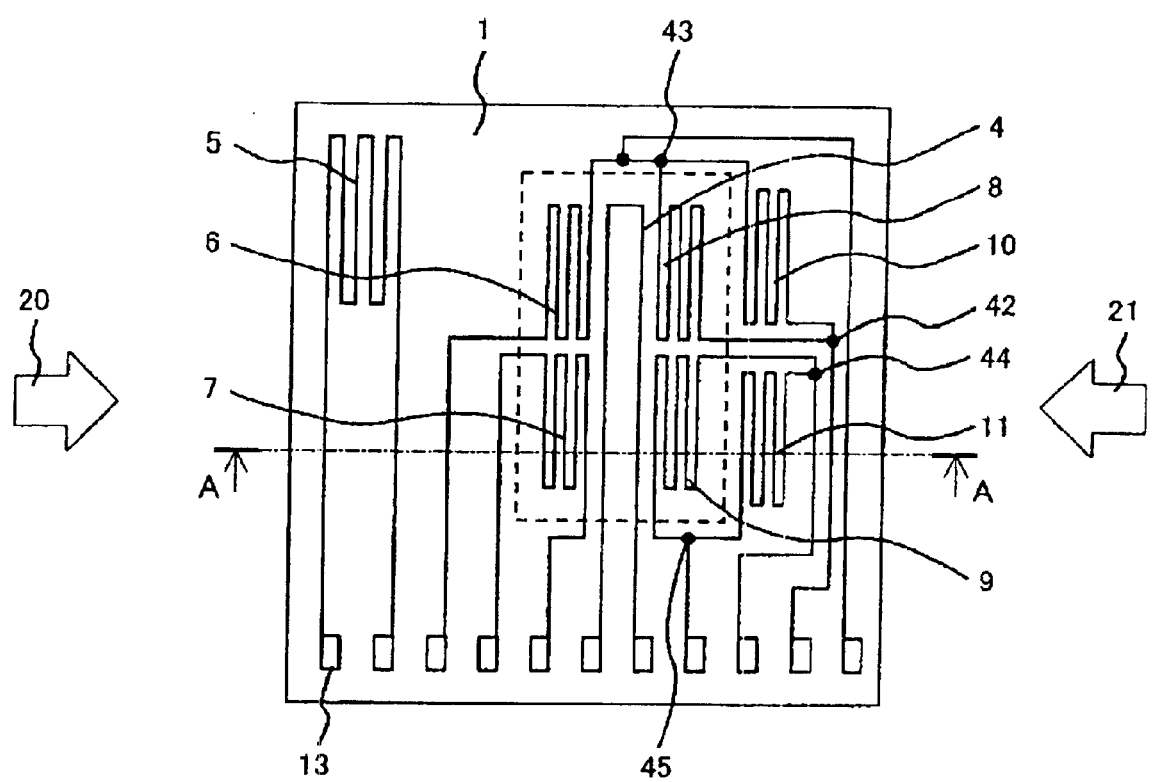
FIG. 1 is a pattern diagram of a flow rate measuring element as a first embodiment of the present invention.
Figure 1:
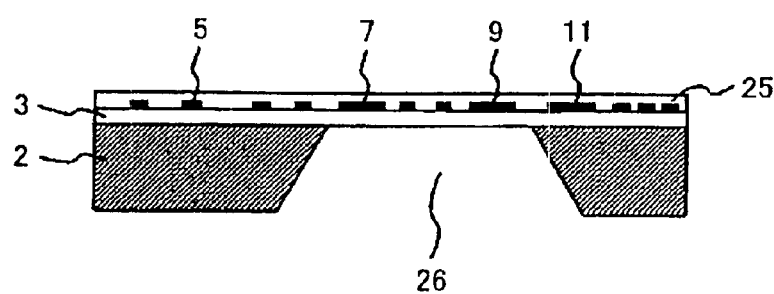

The preferred embodiments of the present invention will be described with reference to the accompanying drawings. FIG. 1 is a structural diagram of a flow rate measuring element illustrating an embodiment of a flow rate sensor of the present invention. The flow rate measuring element 1 is manufactured with the semiconductor manufacturing technology. On a single crystal silicon substrate 2, a silicon dioxide layer is formed as an electrical insulation layer 3 with the thermal oxidation or CVD (Chemical Vapor Deposition) method or the like, while a silicon nitride layer is also formed with the CVD method or the like. Next, a polycrystalline silicon layer is formed with the CVD method or the like and phosphorus (P) is doped as an impurity with the thermal diffusing or ion implantation method to obtain the predetermined resistance value. Thereafter, a heater 4, an intake air temperature detection resistive element 5, upstream temperature sensors 6, 7, downstream temperature sensors 8, 9 and downstream resistive elements 10, 11 or the like are formed by patterning the polycrystalline silicon layer. As the resistive element, it is also possible to form a resistive element having higher temperature coefficient by employing platinum or the like although the manufacturing cost rises a little.

Next, a silicon nitride layer and a silicon dioxide layer are formed as the protection layers 25 with the CVD method or the like. Thereafter, the protection layer of the part to form an electrode 13 is removed by patterning the protection layer 25. Next, an aluminum layer is formed and it is then patterned with the etching method. Finally, in view of forming a cavity portion 26, a silicon nitride layer which will become the mask is formed, with the CVD method or the like, on the surface, where the heater 4 is not formed, of the single crystal silicon substrate 2 and then this silicon nitride layer is patterned. Thereafter, the cavity portion 26 is formed with anisotropic etching method. With formation of such cavity portion, the area where the heater 4, upstream temperature sensors 6, 7, downstream temperature sensors 8, 9 are allocated changes to the thermally insulated thin film structure body. Finally, the silicon substrate is divided into chips through the dicing process. The divided flow rate measuring element 1 is formed, for example, to have the size in the longer side of about 5 mm and shorter side of about 2.5 mm.

Figure 3:
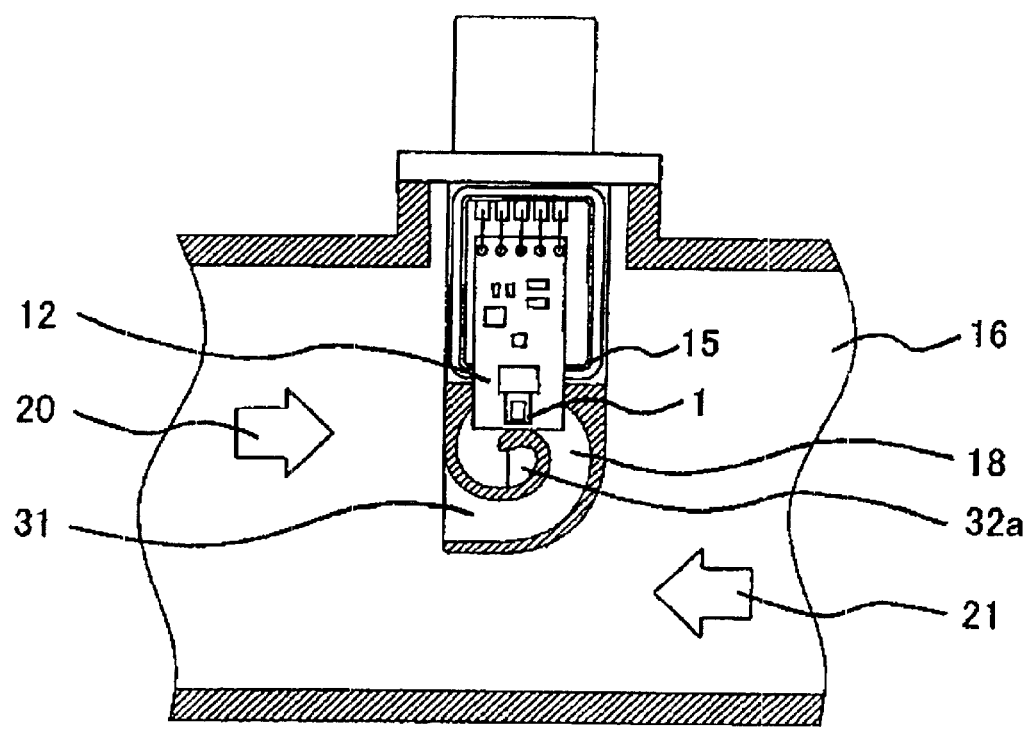
FIG. 3 is a partial cross-sectional view illustrating application of a flow rate sensor of the present invention.

FIG. 3 illustrates a structure where the flow rate measuring element is mounted into an internal combustion engine. A supporting body 12 of the flow rate measuring element 1 is formed of a laminated substrate of glass ceramics. As the supporting body 12, it is also possible to employ, in addition, a ceramic burned in the higher temperature condition or a metal plate, etc. However, since the flow rate measuring element 1 is required to be thermally insulated from the peripheral members, it is preferable to introduce a laminated substrate of glass ceramics having small thermal conductivity. Moreover, employment of the laminated substrate makes it possible to realize supply of the electric power to the flow rate measuring element 1 and to form a circuit to process the signals from the flow rate measuring element 1 through the integration with the supporting body 12.

With integration of the supporting body and drive circuit as described above, the number of components and bonding areas can be reduced. Therefore, this integration is advantageous in both cost and reliability. Moreover, since the circuit can be reduced in size by forming the circuit to control the flow rate measuring element 1 through the use of an internal layer conductor of the laminated substrate, the flow rate sensor can also be reduced in size.

The flow rate measuring element 1 is bonded to the supporting body 12 with an epoxy or silicone system bonding agent and an electrode 13 of the flow rate measuring element 1 and an electrode of the supporting body 12 are electrically connected, for example, with a connecting wire such as gold wire. The supporting body 12 where the flow rate measuring element 1 is mounted is mounted into a housing case 15 using the silicone system bonding agent. Moreover, the housing case 15 is inserted into the intake air passage 16. In FIG. 3, the air (forward flow 20) flowing toward the engine from an air cleaner in the intake air passage 16 flows toward the outlet port 32 from the inlet port 31 of the sub-passage 18.

FIGS. 2A and 2B are circuit diagrams for describing operation principle of the flow rate measuring element. As illustrated in FIG. 2B, the heater 4 is subjected to the feedback control so that it becomes higher in the temperature than the intake air temperature detecting resistive element 5, for example, by about 150° C. Accordingly, when the intake air temperature detecting resistive element 5 is in the temperature of 20° C., the average temperature of heater rises up to about 170° C.

FIG. 2A illustrates a bridge circuit of the flow rate measuring element. In this bridge circuit, the upstream temperature sensors Ru1, Ru2 and downstream temperature sensors Rd1, Rd2 are respectively allocated symmetrically at the four sides and the downstream temperature sensors Rd1, Rd2 are respectively connected in parallel with a resistor Rdd. A power source Vref is applied to the connecting points 43, 45 of the bridge and a potential difference between the potential V3 of the connecting point 42 and the potential V4 of the connecting point 44 is detected.

The upstream temperature sensors 6, 7 and downstream temperature sensors 8, 9 formed on the thin film are heated with the heater 4 up to the predetermined temperature. The temperature coefficients of resistance of the upstream temperature sensors 6, 7, downstream temperature sensors 8, 9 and resistor Rdd are set to almost the identical value. When the flow rate is zero, since the upstream temperature sensors 6, 7 and the downstream temperature sensors 8, 9 are equally heated with the heater 4, these sensors are in the average temperature of about 140° C. Since the downstream resistive elements 10, 11 are allocated in the external side of the thin film portion, these are heated only up to the temperature identical to that of the intake air temperature detecting resistive element 5.

Figure 2:
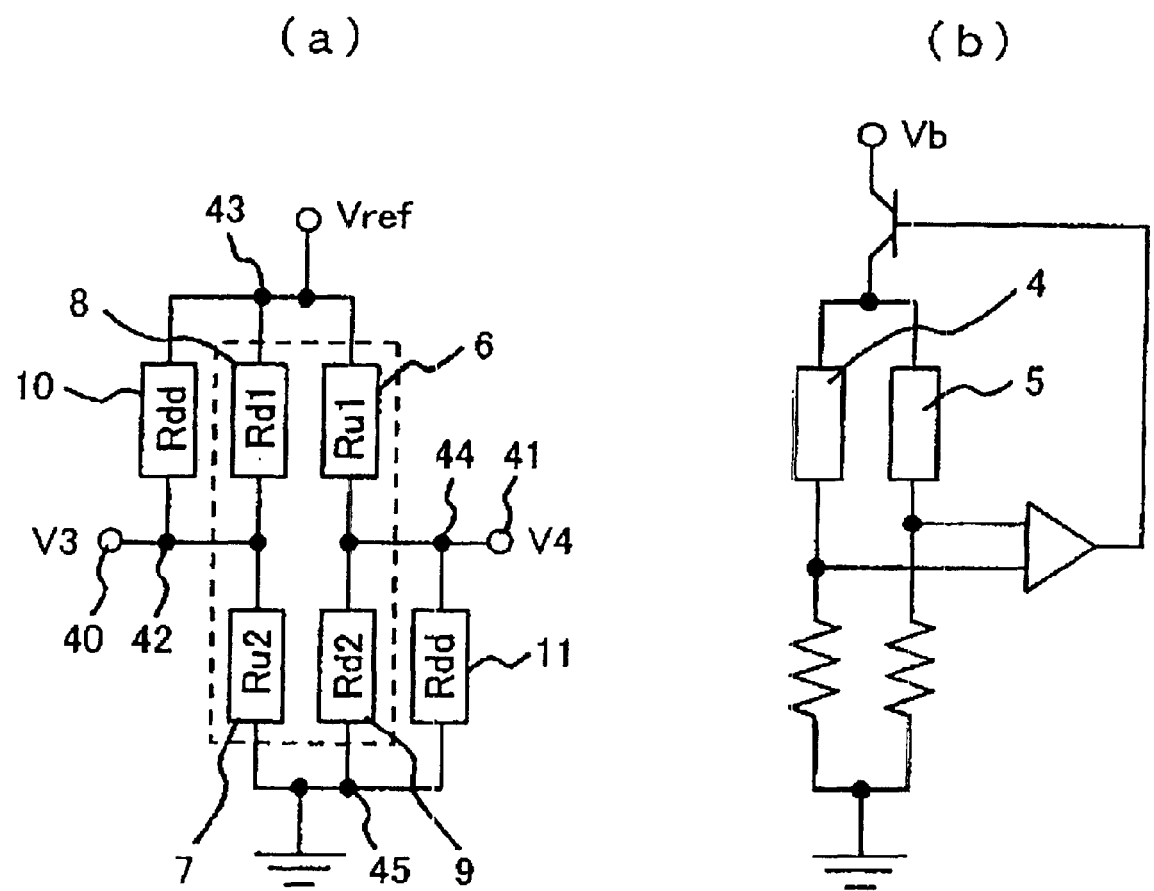
FIGS. 2A and 2B are circuit diagrams for describing the operation principle of the first embodiment.

When the flow rate is zero, the upstream temperature sensors 6, 7, downstream temperature sensors 8, 9 and downstream resistive elements 10, 11 are no longer influenced easily with disturbance such as variation of Vref or the like by setting the resistance value so that the contacts 40 and 41 in FIG. 2 are set to the identical voltage. In this embodiment, the relationship expressed by the formula (1) can be established between the combined resistance value Rd1//Rdd of the resistance value Rd1 of the downstream temperature sensor 8 and the resistance value Rdd of the downstream resistive element 10 and the resistance value Ru1 of the upstream temperature sensor 6.

$$Ru1 = Rd1 // Rdd \tag{1}$$

Similarly, the relationship expressed by the formula (2) can be established between the combined resistance value d2//Rdd of the resistance value Rd2 of the downstream temperature sensor 9 and the resistance value Rdd of the downstream resistive element 11 and the resistance value Ru2 of the upstream temperature sensor 7.

$$Ru2 = Rd2 // Rdd \quad (2)$$

In addition, it is also possible to easily increase the resistance value by making narrower the pattern width of the downstream temperature sensors 8, 9 than that of the upstream temperature sensors 6, 7.

Figure 9:
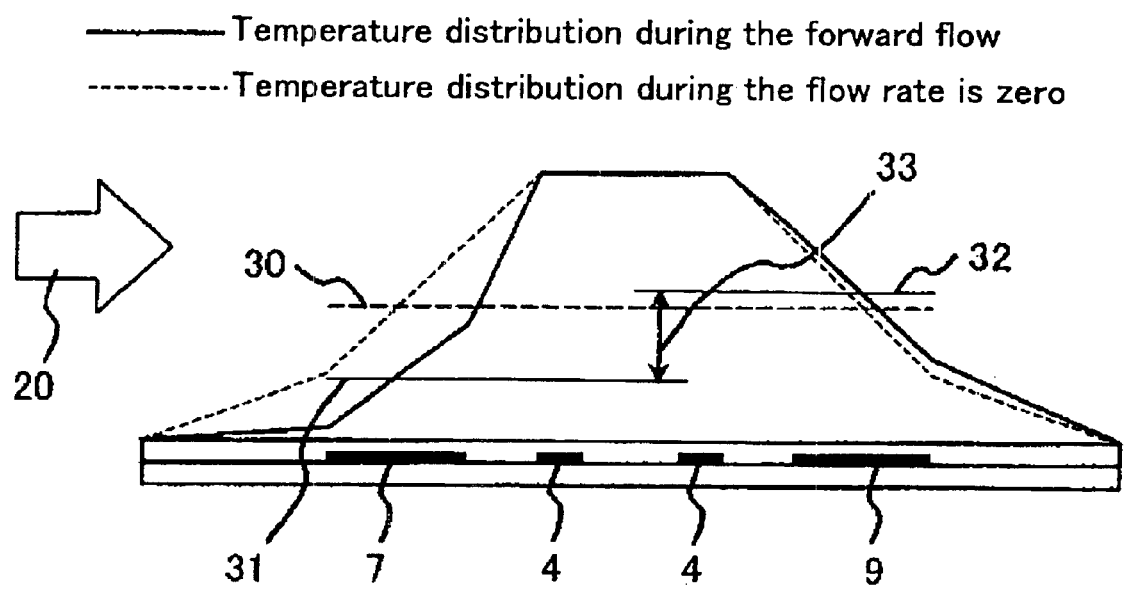
FIG. 9 is a schematic diagram illustrating temperature distribution of a thin film portion of the present invention.

Here, when the forward flow 20 is generated, the upstream temperature sensors 6, 7 are cooled, as illustrated in the schematic diagram of FIG. 9, lower than the average temperature 30 of the temperature sensor when the flow rate is zero and reaches the average temperature 31 of the upstream temperature sensor when the forward flow is generated. On the other hand, since the downstream temperature sensors 8, 9 are heated more than those when the flow rate is zero, temperature of these sensors rises a little up to the average temperature 32 of the downstream temperature sensor when the forward flow is generated. Accordingly, temperature difference 33 is generated between the upstream temperature sensors 6, 7 and the downstream temperature sensors 8, 9. Since the resistance values of the upstream temperature sensors 6, 7 and downstream temperature sensors 8, 9 vary in accordance with such temperature change, potential difference is also generated conforming to this variation of resistance value. Therefore, this potential difference changes depending on the flow rate and can be defined as a flow rate signal.

As is apparent from FIG. 9, temperature change in the upstream side is larger than that in the downstream side. Accordingly, when the forward flow 20 is generated, temperature relationship between the upstream temperature sensors 6, 7 and the downstream temperature sensors 8, 9 may be illustrated in FIG. 4. Namely, it can be said that the temperature sensor allocated in the upstream side for the forward flow can provide much contribution to the flow rate detection signal.

From FIGS. 2A and 2B, the potential V3 of the contact 40 is expressed with the formula (3) while the potential V4 of the contact 41 is expressed with the formula (4).

$$V3 = Vref \times Ru2 / (Ru2 + Rd1 // Rdd) \quad (3)$$

$$V4 = Vref \times (Rd2 // Rdd) / (Ru1 + Rd2 // Rdd) \quad (4)$$

Here, when $(Ru2+Rd1//Rdd)=(Ru1+Rd2//Rdd)=A$ is satisfied, the potential difference dVf when the forward flow is generated can be expressed with the formula (5).

$$dVf = V4 - V3 = Vref/A \times (Rd2 // Rdd - Ru2) \quad (5)$$

Meanwhile, when the reverse flow is generated, the downstream temperature sensors 8, 9 are cooled, on the contrary to above, and the upstream temperature sensors 6, 7 are heated. Therefore, temperature difference is generated, enabling detection of the flow rate. In this case, the potential V3 of the contact 40 is expressed with the formula (3), while the potential V4 of the contact 41, with the formula (4).

When $(Ru2+Rd1//Rdd)=(Ru1+Rd2//Rdd)=A'$ is satisfied here, voltage difference dVr when the reverse flow is generated can be expressed by the formula (6).

$$dVr = V3 - V4 = Vref/A' \times (Ru2 - Rd2 // Rdd) \quad (6)$$

Figure 4:
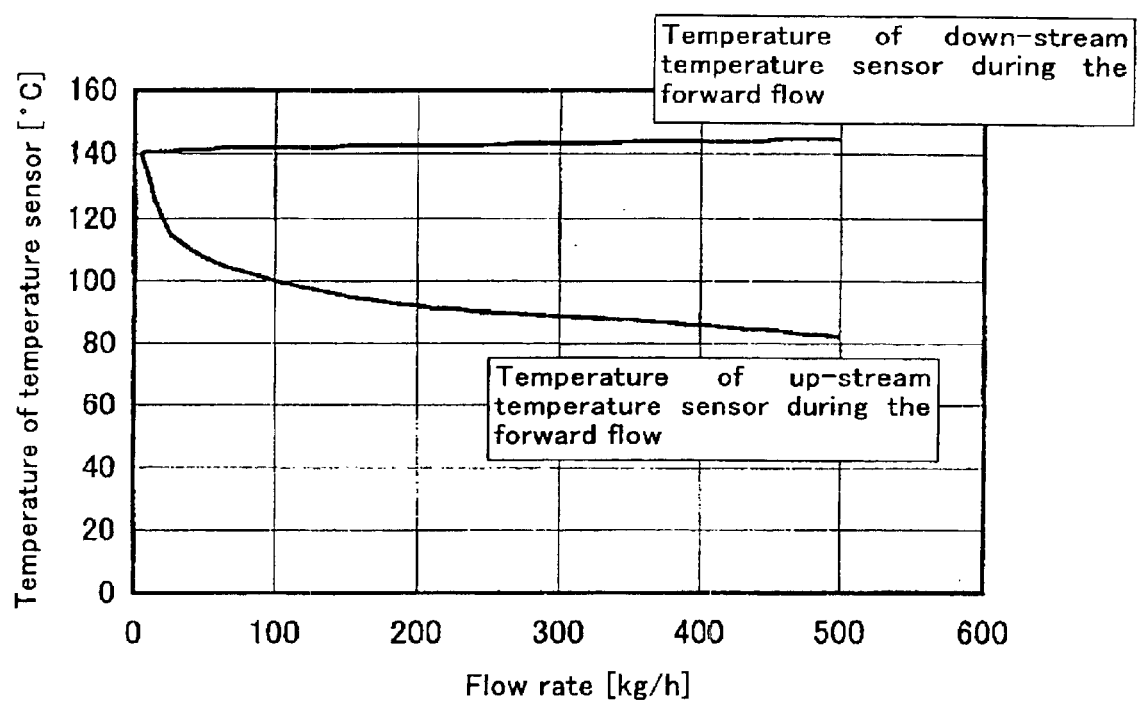
FIG. 4 is a flow rate—temperature characteristic diagram of a temperature sensor of the present invention.
Figure 10:
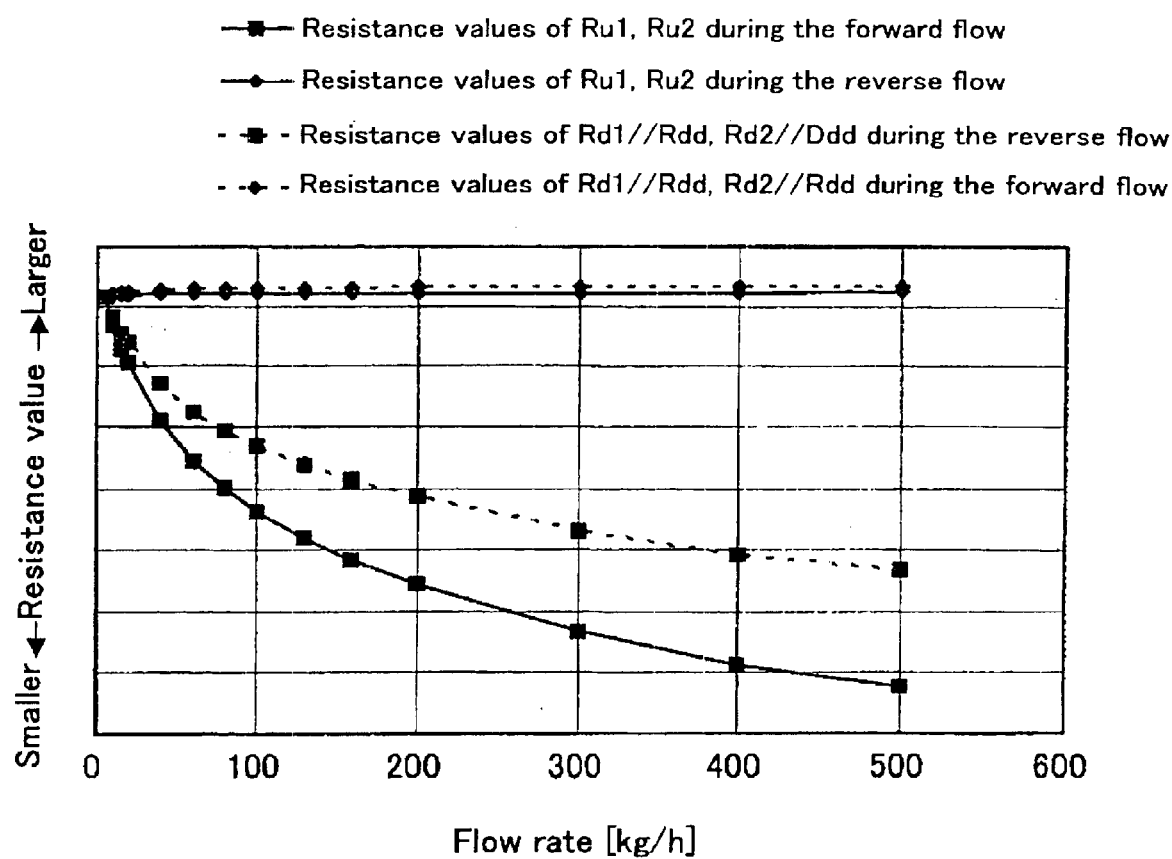
FIG. 10 is a resistance value—flow rate characteristic diagram of the temperature sensor.

Here, the values of Ru1, Ru2, Rd1//Rdd, Rd2//Rdd in the forward flow and reverse flow are expressed as illustrated in FIG. 10 on the basis of the temperature characteristic of FIG. 4. Accordingly, since A<A', the relationship expressed with the formula (7) can be attained.

$$Rd2 // (Rdd - Ru2) > (Ru2 - Rd2 // Rdd) dVf > dVr \quad (7)$$

In this embodiment, for example, when the flow rate is 500 kg/h, dVf becomes about 200 mV (dVf=200 mV) and when the flow rate is −500 kg/h, dVr becomes about 100 mV (dVr=100 mV).

Figure 5:
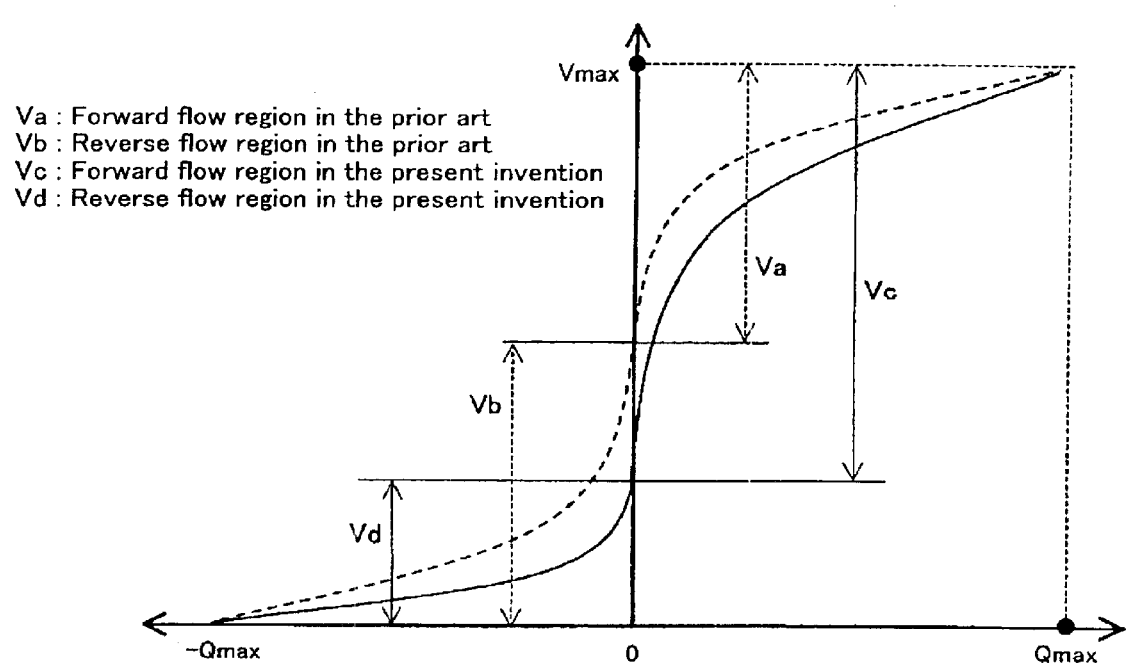
FIG. 5 is a characteristic diagram illustrating relationship between forward flow regions, reverse flow regions and a voltage signal.

FIG. 5 illustrates the flow rate—voltage characteristic after the span adjustment. In this embodiment, the asymmetrical characteristic of the forward flow region Vc and reverse flow region Vd can be obtained for the forward flow region Va and reverse flow region Vb of the conventional characteristic. In this asymmetrical characteristic, the forward flow and reverse flow characteristics can be varied freely by adequately setting the resistance values of the downstream temperature sensors 8, 9 and the downstream resistive elements 10, 11 depending on the required reverse flow rate. Moreover, since a resistive element can be formed simultaneously with the upstream and downstream temperature sensors with the semiconductor process by forming the downstream resistive element on the flow rate measuring element, the relative accuracy for the upstream and downstream temperature sensors can be improved and unevenness of products can be reduced.

As illustrated in FIG. 1, the contacts 42, 43, 44, 45 of the downstream resistive elements 10, 11, and downstream temperature sensors 8, 9 are formed in the external side of the thin film portion. Accordingly, if the thin film portion is broken, self-diagnosis can be done for the sensors only with the signal from the flow rate sensor.

When the upstream and downstream temperature sensors are broken, the contact 40 is connected to Vref and contact 41 is connected to GND via the downstream resistive elements 10 and 11, respectively. Therefore, since potential difference between the contacts 40 and 41 becomes very large, an output is reduced almost to zero (0). When the fault diagnosis region is set to the voltage range of 0 to 0.5 V, fault diagnosis can be realized only with an output signal of the flow rate sensor.

In the case where such diagnosis region is set, since the forward flow region (1), reverse flow region (2), diagnosis region (3) must be provided within the voltage range of 0 to 5 V, the forward flow region used in general tends to be reduced in comparison with the conventional region. Therefore, it is very effective to introduce the method of this embodiment to compress the reverse flow region used only when the pulsation is generated and to expand relatively the forward flow region.

In the first embodiment described above, the downstream resistive elements 10, 11 are formed in the external side of the thin film portion on the flow rate measuring element 1. However, even when such resistive elements are formed within the thin film portion, the response characteristic of the flow rate measuring element 1 can be maintained asymmetrically by allocating these resistive elements to the area where these are not influenced by the heat generated from the heater 4 easier than the downstream temperature sensors 8, 9.

Figure 6:
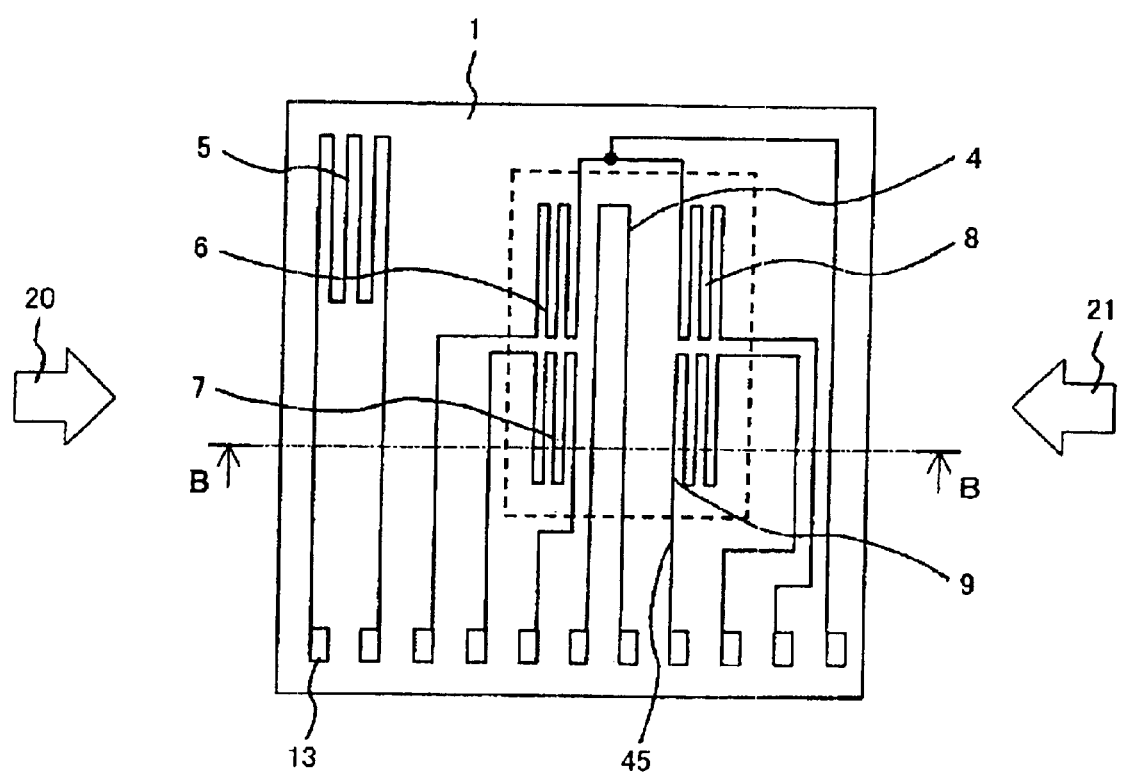
FIG. 6 is a pattern diagram of the flow rate measuring element as a second embodiment of the present invention.
Figure 6:
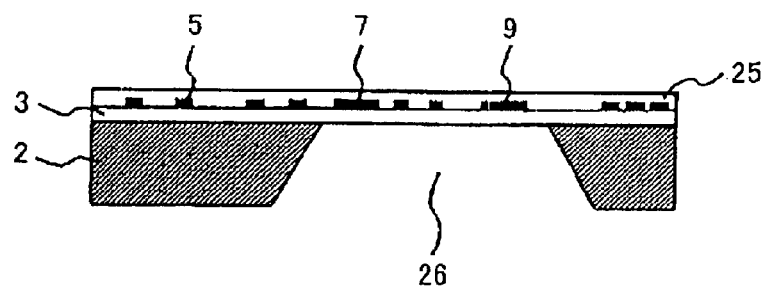

It is also possible that thermal influence of heater to be applied on the downstream temperature sensor is lowered to obtain the asymmetrical characteristic, for example, by setting the distance L1 between the upstream temperature sensors 6, 7 and the heat generating resistive element 4 and the distance L2 between the downstream temperature sensors 8, 9 and the heat generating resistive element 4 to satisfy the relationship of L1<L2 as illustrated in FIG. 6.

Moreover, if the downstream resistive elements 10, 11 cannot be formed on the flow rate measuring element in order to reduce the size of the flow rate measuring element, the resistive elements 10, 11 can also be formed in the drive circuit portion as described above.

Next, the second embodiment of the present invention will be described. In the case where a resistive element to be formed in the flow rate measuring element 1 is formed of polycrystalline silicon, the temperature coefficient of resistance may be varied by changing the doping concentration of impurity described above.

FIG. 6 illustrates a structure of the flow rate measuring element based on the second embodiment. The flow rate measuring elements are formed so that the upstream temperature sensors 6, 7 have the temperature coefficient of resistance TCRu and the downstream temperature sensors 8, 9 have the temperature coefficient of resistance TCRd to satisfy the relationship of TCRu>TCRd.

FIGS. 7A and 7B are circuit diagrams illustrating operation principle of the second embodiment. FIG. 7A illustrates a bridge circuit of the temperature sensor, while FIG. 7B illustrates a control circuit of the heater. The bridge circuit is identical to the circuit of the first embodiment, except for the point that a parallel resistance is not provided. The heater control circuit is identical to that of the first embodiment. Accordingly, the flow rate characteristic can be obtained, in which the reverse flow region is compressed as in the case of FIG. 5. Moreover, the similar effect can also be obtained by changing the materials of the upstream temperature sensors 6, 7 and the downstream temperature sensors 8, 9 to satisfy the relationship of TCRu>TCRd. With the method described above, it is possible to attain the effect to reduce variation of output when the reverse flow is generated by relatively increasing the sensitivity of the forward flow for the reverse flow.

Figure 7:
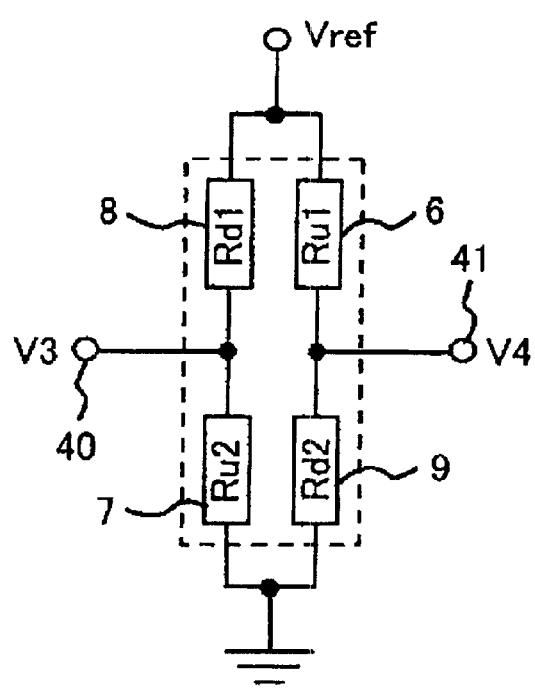
FIGS. 7A and 7B are circuit diagrams for describing operation principle of the second embodiment.
Figure 7:
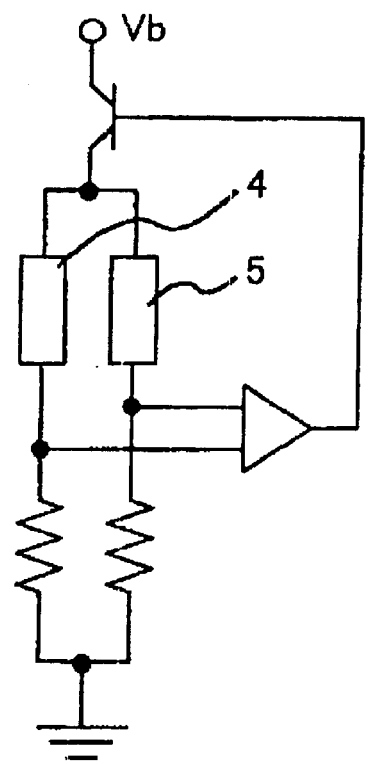

However, in the second embodiment, since the upstream temperature sensors 6, 7 and the downstream temperature sensors 8, 9 are eliminated when the thin film portion is broken, the potentials of the contacts 40 and 41 become equal in the circuit of FIG. 7 and moreover it becomes impossible to discriminate the condition from that when the flow rate is zero. Accordingly, when the flow rate sensor not provided with the downstream resistive elements 10, 11 is used in an automobile, the information other than that of the flow rate sensor is also required in order to recognize the fault condition of the flow rate sensor.

Figure 11:
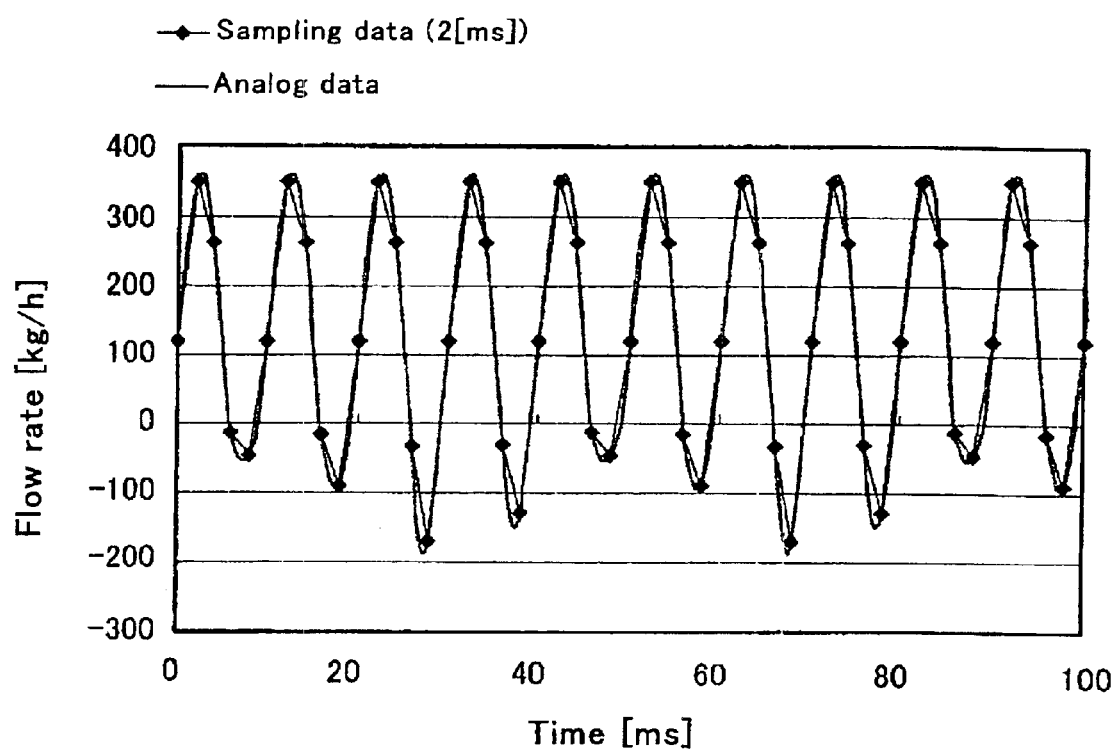
FIG. 11 is a waveform diagram when engine pulsation is generated.

If the pulsation of the engine becomes large and a reverse flow is generated, the waveform upon the occurrence of the reverse flow becomes nonuniform as shown in FIG. 11, due to the shape of intake pipe. One of the reasons is that the flow around the flow rate sensor is disturbed when the pulsation is generated because the flow rate sensor is inserted within the intake pipe. Namely, since the disturbed flow reaches the flow rate measuring element passing the bypass passage, the flow rate measuring element can detect the disturbed condition of flow.

However, since sensitivity when the reverse flow is generated is suppressed in the present invention, amount of variation is relatively reduced in comparison with that in the forward flow. Moreover, since the detection of reverse flow is not executed, flow rate error when the reverse flow is generated is almost in the equal level to that of the existing flow rate sensor which can detect reverse flow.

Figure 8:
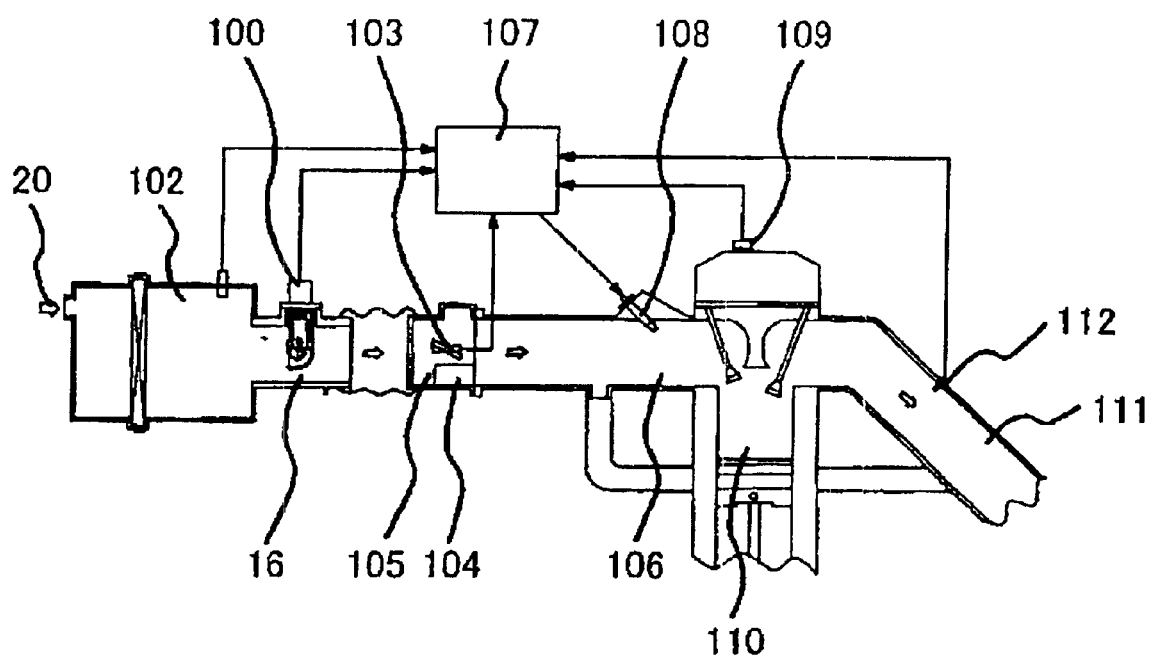
FIG. 8 is a schematic diagram illustrating an internal combustion engine to which the flow rate sensor of the present invention is applied.

FIG. 8 is a schematic diagram of a control system used in an internal combustion engine such as a gasoline engine or the like. The intake air of the engine flows through the intake air passage 16 which is formed of the air cleaner 102, intake air passage 16, throttle angle sensor 103, idle speed control valve 104 and throttle body 105 integrated with the intake manifold 106. In the course of this intake air passage 16, the flow rate sensor 100 of the present invention detects the flow rate and flowing direction. The detected signal is inputted to a vehicle control unit 107 with the voltage or frequency. The flow rate signal is used for the control of a combustion structure composed of an injector 108, a revolution speed meter 109, an engine cylinder 110, an exhaust manifold 111 and an oxygen concentration meter 112 and for the control of a sub-system.

Although not illustrated in the figure, the basic structure of a diesel engine system is almost identical to that of the gasoline engine system and therefore the flow rate measuring device of the present invention can also be applied thereto.

The technology of the present invention can also be applied to a flow rate measuring device to measure the flow rate of fluid such as air or hydrogen in the system using a fuel battery.

According to the present invention, since the flow rate characteristic in which the flow rate characteristic of reverse flow is compressed can be obtained for the flow rate characteristic of forward flow, the reverse flow can be detected within the voltage range which is narrower than the conventional voltage range and moreover lowering of sensitivity of the forward flow can be eliminated.

Moreover, since waveform when the reverse flow is generated is virtually dulled with parallel connection of the resistive elements to the downstream temperature sensors, amount of variation is relatively reduced. In addition, since the reverse flow detection is conducted, flow rate error when the reverse flow is generated can also be set almost to the level which is equal to that of the conventional flow rate sensor which can realize detection of reverse flow.

Further, the self-diagnosis of the flow rate sensor based on an output signal of the flow rate sensor can also be realized by providing the connection points between the downstream resistive elements and the downstream temperature sensors to the external side of the thin film portion.

What is claimed is:

1. A flow rate sensor comprising a heater, an upstream temperature sensor allocated in a forward flow side of said heater, and a downstream temperature sensor allocated in a reverse flow side of said heater, wherein a voltage is applied to said upstream temperature sensor and said downstream temperature sensor in order to detect a flow rate using a potential difference generated between said upstream temperature sensor and said downstream temperature sensor, wherein said upstream temperature sensor and said downstream temperature sensor are provided with different thermal characteristics such that the thermal characteristics of a forward flow where a fluid flows toward said downstream temperature sensor from said upstream temperature sensor are asymmetrical to those of a reverse flow where said fluid having an identical flow rate to that of said forward flow flows toward said upstream temperature sensor from said downstream temperature sensor.

2. A flow rate sensor comprising a heater, an upstream temperature sensor allocated in a forward flow side of said heater, and a downstream temperature sensor allocated in a reverse flow side of said heater, wherein a voltage is applied to said upstream temperature sensor and said downstream temperature sensor in order to detect flow rate using a potential difference generated between said upstream temperature sensor and said downstream temperature sensor, wherein a potential VF generated between said upstream temperature sensor and said downstream temperature sensor during the forward flow toward said downstream temperature sensor from said upstream temperature sensor and a potential VR generated between said upstream temperature sensor and said downstream temperature sensor during the reverse flow, with the identical flow rate to that of the forward flow, toward said upstream temperature sensor from said downstream temperature sensor satisfy the relationship VF>VR.

3. A flow rate sensor comprising a thin film portion comprising a heater, an upstream temperature sensor allocated in a forward flow side of said heater and a downstream temperature sensor allocated in a reverse flow side of said heater, wherein a voltage is applied to said upstream temperature sensor and said downstream temperature sensor in order to detect flow rate using a potential difference generated between said upstream temperature sensor and said downstream temperature sensor, wherein a resistive element is connected in parallel to said downstream temperature sensor at a position such that said resistive element is thermally more isolated from said heater than said downstream temperature sensor is.

4. The flow rate sensor according to claim 3, wherein said resistive element is formed in the external side of said thin film portion.

5. The flow rate sensor according to claim 3, wherein said upstream temperature sensor, said downstream temperature sensor and said resistive element connected in parallel to said downstream temperature sensor are formed of materials having almost equal temperature coefficients of resistance.

6. A flow rate sensor comprising, in the thin film portion, a heater, an upstream temperature sensor allocated in the forward flow side of said heater, and a downstream temperature sensor allocated in the reverse flow side of said heater in order to detect flow rate using potential difference generated between said upstream temperature sensor and said downstream temperature sensor by applying voltages to said upstream temperature sensor and said downstream temperature sensor, wherein said upstream temperature sensor has the temperature coefficient of resistance TCRu and said downstream temperature sensor has the temperature coefficient of resistance TCRd respectively, in order to satisfy the relationship of TCRr>TCRd.

7. A flow rate sensor comprising a thin film portion comprising a heater, an upstream temperature sensor allocated in a forward flow side of said heater and a downstream temperature sensor allocated in a reverse flow side of said heater, wherein a voltage is applied to said upstream temperature sensor and said downstream temperature sensor in order to detect flow rate using a potential difference generated between said upstream temperature sensor and said downstream temperature sensor, wherein said downstream temperature sensor is allocated in a position thermally more isolated from said heater than said upstream temperature sensor and the potential difference generated by the forward flow is asymmetrical to the temperature difference generated by the reverse flow of the same amount as the forward flow.

8. A flow rate sensor comprising a thin film portion comprising a heater, an upstream temperature sensor allocated in a forward flow side of said heater and a downstream temperature sensor allocated in a reverse flow side of said heater, wherein a voltage is applied to said upstream temperature sensor and said downstream temperature sensor in order to detect flow rate using a potential difference generated between said upstream temperature sensor and said downstream temperature sensor, wherein a resistive element connected in parallel to said downstream temperature sensor and the connecting point thereof are allocated in the external side of said thin film portion.

9. The flow rate sensor according to claim 8, wherein fault diagnosis of said flow rate sensor is executed based on potential difference generated in said resistive element when the wiring of said upstream temperature sensor and said downstream temperature sensor formed in said thin film portion is broken.

10. The flow rate sensor according to claim 8, wherein a bridge circuit is formed with a pair of said upstream temperature sensors and a pair of said downstream temperature sensors, and said upstream temperature sensors and said downstream temperature sensors are allocated to the four sides of said bridge so that the temperature sensors of the same type are never connected with each other.

11. A control system for controlling an internal combustion engine using a flow rate signal detected by a flow rate sensor according to, wherein the internal combustion engine is controlled using the flow rate signal indicating the flow rate of intake air.

* * * * *